UNITED STATES PATENT OFFICE.

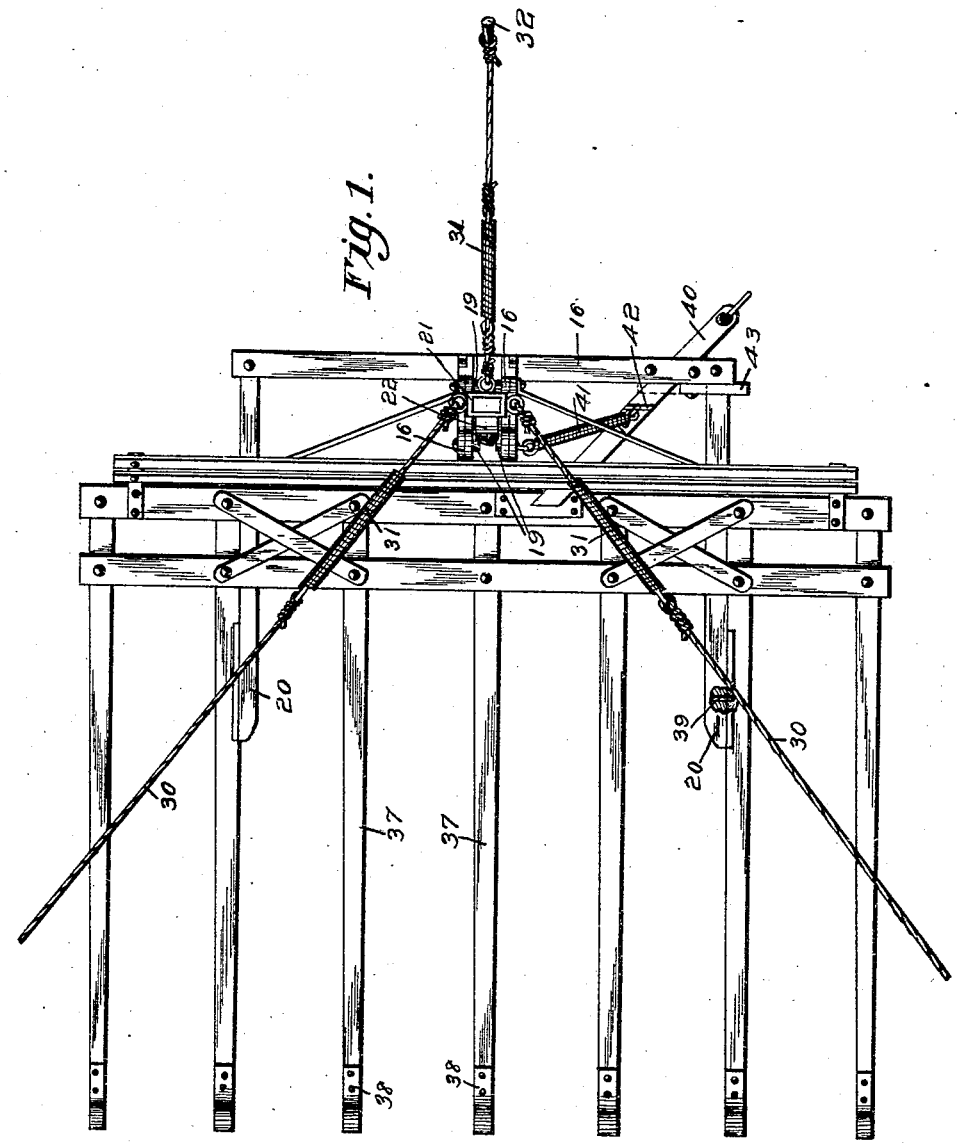

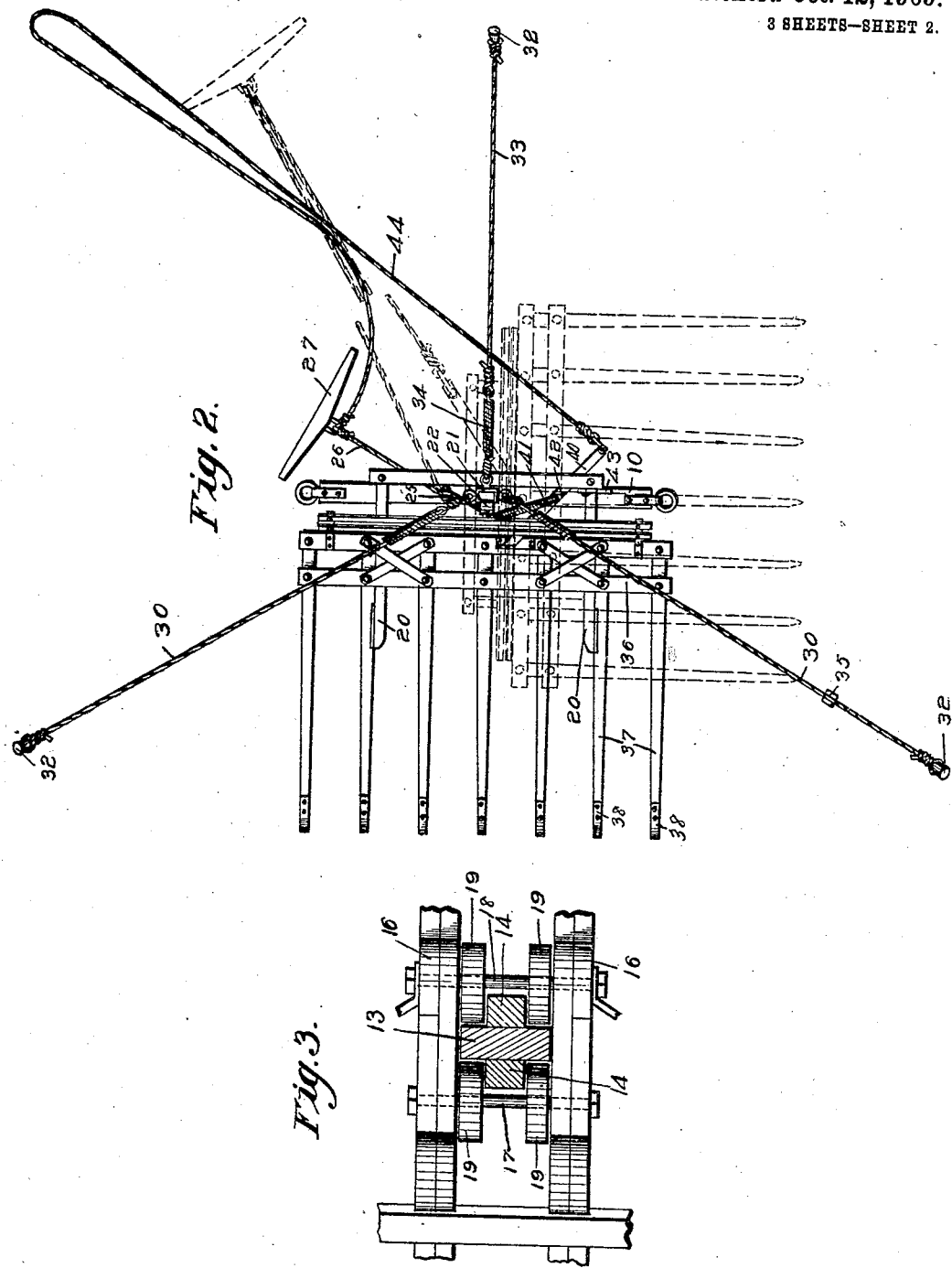

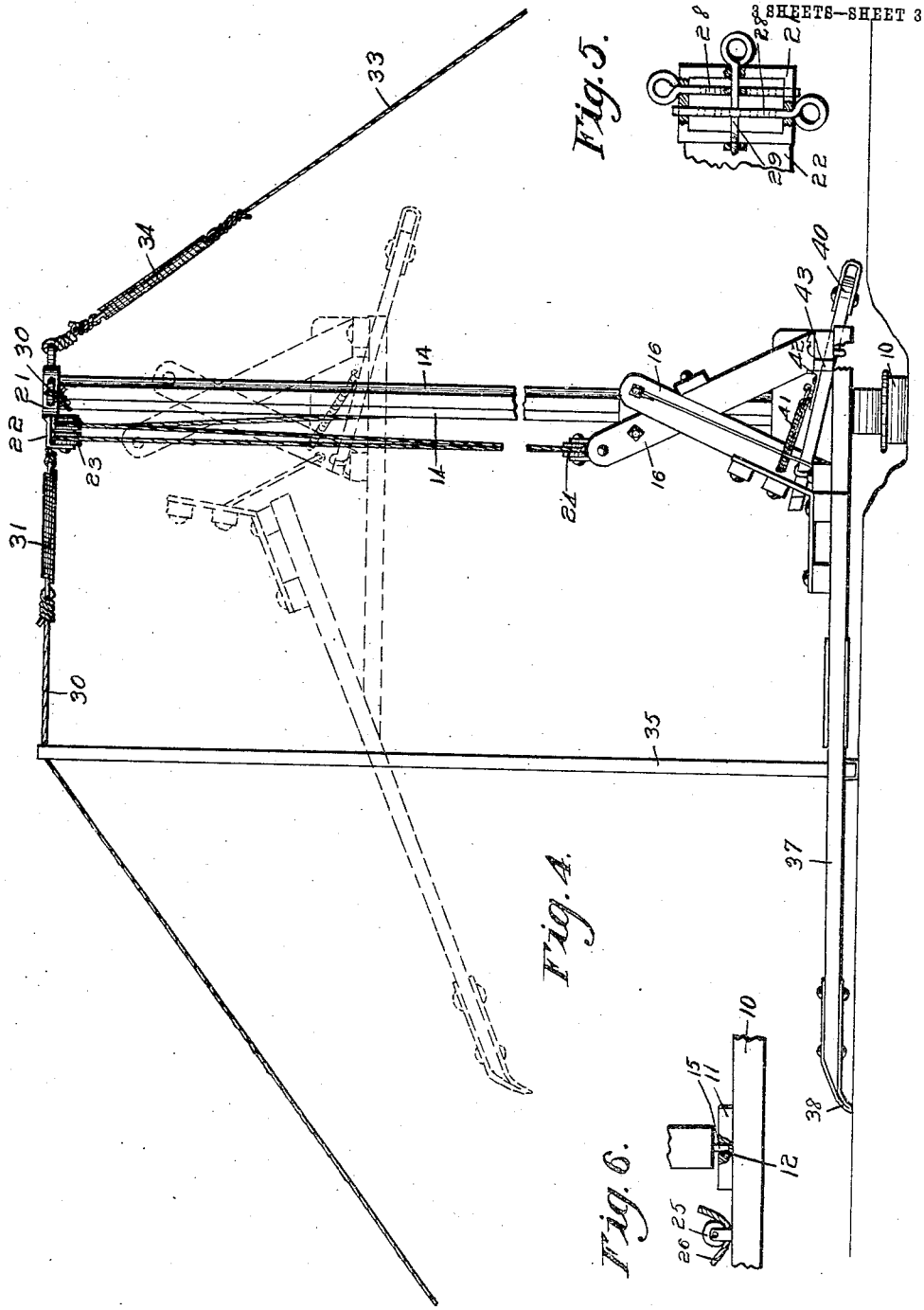

LEROY J. LINDSAY, OF SEYMOUR, IOWA, ASSIGNOR OF ONE-HALF TO JOHN LA FOLLETTE, OF SEYMOUR, IOWA.

HAY-STACKER.

936,332. Specification of Letters Patent. Patented Oct. 12, 1909.

Application filed October 29, 1908. Serial No. 460,152.

*To all whom it may concern:*

Be it known that I, LEROY J. LINDSAY, a citizen of the United States, residing at Seymour, in the county of Wayne and State of Iowa, have invented a certain new and useful Hay-Stacker, of which the following is a specification.

This invention relates to that class of hay stackers in which the material is received upon a platform resting upon the ground and then is elevated by means of a rope or pulley arrangement operated by a draft animal, and when at its upper limit, the platform is turned to position at right-angles and then tripped to permit the contents to discharge.

My object is to provide a hay stacker of this class of simple, durable and inexpensive construction, so arranged that the platform may be elevated to any desired height, and may also be turned to any desired angle by simply driving the draft animal to the desired distance from the hay stacker and also by driving the draft animals at different angles with relation to the stacker, so that the height to which the platform is elevated and the angle to which it is turned can be regulated and controlled wholly by the person in charge of the draft animal.

A further object is to provide means for automatically releasing the tilting platform so that it may discharge its contents when the platform has been elevated to the proper height and turned to the proper angle.

A further object is to provide means of simple, and inexpensive construction for automatically returning the platform to its normal receiving position after it has been tilted and its contents discharged.

My invention consists in the construction, arrangement and combination of the various parts of the device, whereby the objects contemplated are attained as hereinafter more fully set forth, pointed out in my claims and illustrated in the accompanying drawings, in which—

Figure 1 shows a top or plan view of the device embodying my invention with the ropes for elevating and controlling the platform omitted. Fig. 2 shows a similar view including the ropes for elevating and controlling the platform. The solid lines in said figure show the position of the platform and its ropes ready to receive a load and the dotted lines in said figure show the positions of the same parts with the platform elevated and moved laterally and ready to be tilted for discharging its load. Fig. 3 shows an enlarged, detail view, partly in section, for illustrating the means by which the loader frame is guided and supported upon the upright or pole. Fig. 4 shows a side elevation of the complete device embodying my invention with the rope for operating the trip bar removed. The dotted lines in said figure show the platform in its tilting position. Fig. 5 shows a detail, plan view of the top of the upright or pole to illustrate the adjustable arms thereon for receiving guy ropes. Fig. 6 shows a detail view of the base, showing the means by which the upright is rotatably mounted therein and the pulley for elevating the rope.

Referring to the accompanying drawings, the base of the device comprises a wooden runner 10 having a plate 11 at its central portion provided with a central opening 12. This base is designed to rest upon the ground surface.

The upright or pole comprises a flat body portion 13 with flat strips 14 at its opposite sides of less width than the body portion 13, as clearly shown in Fig. 3. At the bottom of the upright is a pivot pin 15 designed to enter the opening 12 to thereby rotatably support the upright in the base 10. Slidingly mounted upon the upright is a frame 16 having two shafts 17 and 18 therein upon each of which is rotatably mounted two rollers 19, which rollers rest upon the sides of the upright 13 and have the strips 14 arranged between them. In this way the frame 16 is permitted to move up and down on the upright but is held against rotation relative to the upright. Extended forwardly from the frame 16 are two arms 20 to which the platform is pivotally connected as will hereinafter appear.

At the top of the upright is a bracket 21 having extended forwardly from it an arm 22 in which the pulleys 23 are mounted. The frame 16 is provided with a pulley 24 and the base 10 is provided, near one end, with a pulley 25. A rope or cable 26 has a swingletree 27 attached to one end and is passed under the pulley 25, then over one of the pulleys 23, then under the pulley 24, then over the other one of the pulleys 23, and its other end is attached to the frame 16, at any convenient point thereon. By this arrangement, it is obvious that when a draft animal is attached to the swingle-tree 27 and is advanced, the frame 16 will be elevated.

Mounted upon the bracket 20 are two laterally extended arms 28 adjustable as to length. To each of these arms, I have attached a guy rope 30 and in each guy rope is a contractible coil spring 31. These guy ropes are attached at their other ends to stakes 32 driven in the ground and they normally tend to hold the upright or pole against rotation, however, said upright may be rotated against the tension of the springs 31 and when thus rotated the said springs 31 will tend to return the upright to its normal position. A third guy rope 33 is attached to the rear of the bracket 21 and is connected to a suitable post or stake. This guy rope is also provided with a spring 34. In order to readily and easily adjust the tension of all of the guy ropes after they have been placed in position, I provide a pole 35 having a slotted upper end designed to receive one of the guy ropes 30. This pole is placed with its lower end resting upon the ground and its upper end in engagement with the guy rope and when placed in position, the tension of all of the guy ropes may be adjusted. Another advantageous result accomplished by the pole 35 is that the guy rope to which it is attached is made to extend in a substantially horizontal position laterally from the upright to the end of the pole 35 so that the said guy rope will not interfere with the movements of the hay platform.

The hay platform proper comprises two bars 36 and a series of tines 37, said tines each being preferably provided with a point made of a flat metal strip doubled at its central portion and inclined from its central portion upwardly, one end being secured to the top of the tines and the other end to the bottom, said end being indicated by the numeral 38. By this means the body of the tine is supported above the ground with the said ends resting thereon. The hay platform is pivotally connected with the arms 20 by means of the pivot pins 39 as shown in Fig. 1. The portion of the hay platform adjacent to the frame is heavier than the outer end so that the hay platform normally stands in position with its rear end resting upon the arms 20.

In order to provide for supporting the hay platform in its horizontal position and for releasing it when it is desired to permit it to discharge its contents, I have provided a slide-bar 40 mounted in the frame 16 and extended rearwardly from the hay-platform and laterally therefrom in a direction opposite from the direction in which the rope 26 and swingle-tree 27 are extended from the device. The inner end of the bar 40 normally projects over the rear end of the hay platform, as shown in Fig. 1, and it is normally held in this position by the spring 41. Mounted on the bar 40 is a lug 42 and pivoted to the frame 16 is a block 43. Said block when in the position shown by solid lines in Fig. 1 is out of engagement with the slide-bar 40 and the lug 42, and when it is thrown to the position shown by dotted lines in Fig. 1, then it will engage the lug 42 and prevent the slide-bar 40 from moving rearwardly far enough to permit the hay platform to tilt. Attached to the rear end of the slide-bar 40 is a rope or cable 44, the other end of which is attached to the swingle-tree 27.

For convenience in the description, I have termed the side to which the hay platform extends when at rest, as the front.

In practical use and assuming that the platform is in its position resting on the ground, then a load of material, such as hay, may readily and easily be placed upon it. If it is desired to elevate the hay platform only a short distance before discharging, then the rope 44 is secured to the swingle-tree 27 in such a position that the draft animal will advance only a short distance before stretching the rope taut. Then when the draft animal is advanced the frame 16 and the hay platform will be jointly elevated until the rope 44 is taut, then the first effect of the pull upon the rope 44 will be to turn the hay platform, the frame 16, and the pole or upright to position extending toward the left side of the device, and the next effect of the pull will be to move the slide-bar 40 longitudinally to withdraw its forward end from the rear of the hay platform and to thereby permit the hay platform to tilt. Then, after the load is discharged, the hay platform will return to its horizontal position and when the rope 44 is slack the slide-bar 40 will be projected over the rear of the hay platform by means of the spring 41. Then the springs in the guy ropes will return the hay platform, the frame 16, and the upright to their normal positions with the hay platform extended forwardly and the entire frame 16 and hay platform will then descend by gravity to starting position.

Assuming that it is desired to discharge the contents of the hay platform when it has turned only a small part of its revolution, then the operator drives the draft animal almost straight rearwardly from the device, and if it is desired to turn the hay platform substantially one-fourth of a revolution or more before discharging, then the operator drives the draft animal substantially straight out toward the right side of the device. It is to be understood in this connection that the hay platform will not tilt until the slide-bar 40 is substantially in line with the rope 44, therefore, the operator driving the draft animal may control and regulate the discharge point of the hay platform, and he can also regulate the height at which the hay platform discharges by adjusting the rope 44 on the swingle-tree 27. By the arrangement described, it is obvious that a single operator may ride or drive the draft animal and absolutely control the movements of the hay platform and may determine both the elevation and the angle relative to the pole at which the hay platform will discharge. Furthermore, by means of the construction shown and described by which the hay platform may be made to discharge at different angles, it is obvious that material may be delivered at various points, so that labor may be saved in carrying the said material after it has been discharged from the hay platform.

I claim as my invention.

1. In a device of the class described, the combination of an upright capable of rotary movement, guy ropes attached to its upper ends to normally hold the upright against rotation and capable of yielding sufficiently to permit a slight rotation of the upright, a frame slidingly mounted on the upright, and a tilting platform carried by the frame.

2. In a device of the class described, the combination of an upright capable of rotary movement, guy ropes attached to its upper ends to normally hold the upright against rotation and capable of yielding sufficiently to permit a slight rotation of the upright, springs connected with the guy ropes, a frame slidingly mounted on the upright, and a tilting hay platform carried by the frame.

3. In a device of the class described, the combination of an upright rotatably mounted, arms at the upper end thereof, guy ropes attached to said arms to normally hold the upright against rotation and designed also to permit the upright to rotate to a limited extent, a frame slidingly mounted on the upright, and a tilting hay platform carried by the frame.

4. In a device of the class described, the combination of an upright rotatably mounted, arms at the upper end thereof, guy ropes attached to said arms to normally hold the upright against rotation and designed also to permit the upright to rotate to a limited extent, a frame slidingly mounted on the upright, and a tilting hay platform carried by the frame, said arms being adjustable as to length.

5. In a device of the class described, the combination of an upright, a frame capable of vertical movement on the upright and also capable of limited rotary movement, a tilting platform carried by said frame, a slide-bar mounted in the frame and normally projected over a part of the platform to prevent it from tilting, and a rope attached to the slide-bar and normally extended at an angle relative to it so that when the rope is pulled the first effect will be to rotate the frame and then to move the slide-bar to position for releasing the tilting platform.

6. In a device of the class described, the combination of an upright, a frame capable of vertical movement on the upright and also capable of limited rotary movement, a tilting platform carried by said frame, a slide-bar mounted in the frame and normally projected over a part of the platform to prevent it from tilting, and a rope attached to the slide-bar and normally extended at an angle relative to it so that when the rope is pulled the first effect will be to rotate the frame and then to move the slide-bar to position for releasing the tilting platform, a spring for normally returning the slide-bar, and means for locking the slide-bar.

7. In a device of the class described, the combination of an upright, a frame slidingly mounted upon the upright, said frame being also capable of limited rotation, a tilting platform carried by the frame, pulleys carried respectively by the upright and the frame, a rope passed around said pulleys and having one end extended laterally from the frame and arranged to elevate the frame when the rope is pulled, means for attaching a draft animal to the rope, a slide-bar carried by the frame and extended rearwardly and laterally in a direction opposite from the said rope for elevating the frame, said slide-bar having one end normally projected over the tilting platform, and a rope connected with the slide-bar and also with the first mentioned rope whereby a pull upon the first mentioned rope will have the effect of elevating the frame and then a further pull upon it will have the effect of rotating the frame and then releasing the slide-bar.

Des Moines, Iowa, Oct. 5, 1908.

LEROY J. LINDSAY.

Witnesses:
R. BERRIER,
A. W. GUMP.